US011849339B2

(12) United States Patent
Laroche et al.

(10) Patent No.: US 11,849,339 B2
(45) Date of Patent: Dec. 19, 2023

(54) SELECTING A ROLE FOR AN ACCESS POINT

(71) Applicant: Hewlett Packard Enterprise Development LP, Houston, TX (US)

(72) Inventors: Stephane Laroche, St. Laurent (CA); Jikui Pei, Beijing (CN); Chunfeng Wang, Beijing (CN); Hao Lu, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/739,517

(22) Filed: May 9, 2022

(65) Prior Publication Data

US 2022/0264337 A1    Aug. 18, 2022

Related U.S. Application Data

(63) Continuation of application No. 16/970,081, filed as application No. PCT/CN2018/077517 on Feb. 28, 2018, now Pat. No. 11,356,866.

(51) Int. Cl.
*H04W 24/02* (2009.01)
*H04L 61/5014* (2022.01)
(Continued)

(52) U.S. Cl.
CPC ........... *H04W 24/02* (2013.01); *H04L 41/042* (2013.01); *H04L 61/5014* (2022.05); *H04W 88/08* (2013.01)

(58) Field of Classification Search
None
See application file for complete search history.

(56) References Cited

U.S. PATENT DOCUMENTS 7,912,940 B2   3/2011  LeBlanc et al.
9,137,198 B2   9/2015  Baniqued et al.
(Continued)

FOREIGN PATENT DOCUMENTS

CN   102158294 A   8/2011
CN   105049457 A   11/2015
(Continued)

OTHER PUBLICATIONS

Advanced WiFi Controller Discovery, (Web Page), Retrieved Dec. 26, 2017, 3 Pgs.
(Continued)

*Primary Examiner* — Kenny S Lin
(74) *Attorney, Agent, or Firm* — Hewlett Packard Enterprise Patent Department (57) ABSTRACT

An example access point may comprise a processing resource; and a memory resource storing machine-readable instructions to cause the processing resource to: perform a management system search using a dynamic host configuration protocol (DHCP); determine, in view of the management system search, whether a management system discovered is a controller; and select one of a first role within a centralized local area network and a second role within a distributed local area network based on determining whether the management system is the controller, wherein the first role within the centralized local area network is selected when the management system is the controller.

7 Claims, 4 Drawing Sheets

(51) Int. Cl.
*H04L 41/042* (2022.01)
*H04W 88/08* (2009.01)

(56) References Cited

U.S. PATENT DOCUMENTS

| | | | |
|---|---|---|---|
| 2002/0147764 A1* | 10/2002 | Krupczak | ........... H04L 41/0213 |
| | | | 709/202 |
| 2013/0094402 A1 | 4/2013 | Muhamed et al. | |
| 2014/0046997 A1 | 2/2014 | Dain et al. | |
| 2014/0046998 A1 | 2/2014 | Dain et al. | |
| 2014/0047116 A1* | 2/2014 | Dain | ....................... H04L 67/51 |
| | | | 709/226 |
| 2016/0112252 A1 | 4/2016 | Notari | |
| 2016/0337181 A1* | 11/2016 | Cathrow | .................. H04L 63/08 |
| 2017/0302496 A1 | 10/2017 | Xu et al. | |
| 2019/0281472 A1* | 9/2019 | Liu | ..................... H04L 41/0893 |

FOREIGN PATENT DOCUMENTS

| | | | |
|---|---|---|---|
| CN | 105101273 A | 11/2015 |
| EP | 3232704 A1 | 10/2017 |
| WO | 2017/053303 A1 | 3/2017 |

OTHER PUBLICATIONS

Search Report and Written Opinion received for PCT Application No. PCT/CN2018/077517, dated Nov. 16, 2018, 7 pages.

* cited by examiner

SELECTING A ROLE FOR AN ACCESS POINT

BACKGROUND

In some networks, access points (APs) or routers may provide network connectivity to client devices. The client devices may be laptops, personal computers, smartphones, etc. A network may provide connectivity to offices, residences, university campuses, etc.

DETAILED DESCRIPTION

In a communications network, access points (APs) can provide network connectivity to client devices connected to the APs. For example, several personal computers, laptops, etc. may be connected to an access point for internet access. Different types of APs may be utilized depending on the type of network that the AP is joining. For example, a centralized local area network, such as a local area network being managed by a controller, may utilize one type of AP while a distributed local area network may utilize another type of AP. A controller is an example network management device often used in a centralized management system (in some implementations, centralized management system may refer to a controller). Note that a distributed local area network may refer to a network being managed by a distributed management system. The distributed management system (DMS) can include platforms such as a virtual controller that may be instantiated on another AP or an adaptable management system able to manage access points from different vendors. A customer may purchase two different kinds of APs for network expansion.

In implementations consistent with the disclosure, a universal access point may be able to join either a centralized local area network or a distributed local area network. The universal access point may be, for example, an access point (AP) able to select a role as an access point within a centralized local area network or a role as an access point within a distributed local area network. The AP may perform a search for management systems (management system may refer to a device such as a controller, a platform such as a virtual controller, or a platform such as an adaptable management system). Depending on whether it discovered a controller or a distributed management system, the AP may select a role. If the AP discovered a controller, the AP selects a role as an AP in a centralized local area network. Alternatively, if the AP has discovered a distributed management system, the AP selects a role as an AP of a distributed local area network.

In this way, the AP acts as a universal access point that can join a variety of different kinds of networks, thereby removing or reducing the purchase of different types of access points. In addition to cost savings, a network administrator using an AP that can select a role may also benefit from ease of setup and ease of use.

As used herein, access point (AP), can, for example, refer to a networking hardware device that allows a client device to connect to a wired or wireless network. An AP can include a processing resource, a memory, and input/output interfaces, including wired network interfaces such as IEEE 802.3 Ethernet interfaces, as well as wireless network interfaces such as IEEE 802.11 WLAN interfaces, although examples of the disclosure are not limited to such interfaces. An AP can include memory, including read-write memory, and a hierarchy of persistent memory such as ROM, EPROM, and Flash memory. The processing resource of the AP may be a central processing unit (CPU), microprocessor, and/or other hardware device suitable for retrieval and execution of instructions stored in the memory of the AP, as further described below.

As used herein, AP generally refers to receiving points for any known or convenient wireless access technology which may later become known. Specifically, the term AP is not intended to be limited to IEEE 802.11-based APs. APs generally function as an electronic device that is adapted to allow wireless communication devices to connect to a wired network via various communication standards.

As used herein, client device can, for example, refer to a device including a processor, memory, and input/output interfaces for wired and/or wireless communication. A client device may include a laptop computer, a desktop computer, a mobile device, and/or other wireless devices, although examples of the disclosure are not limited to such devices. A mobile device may refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

Figure 1:
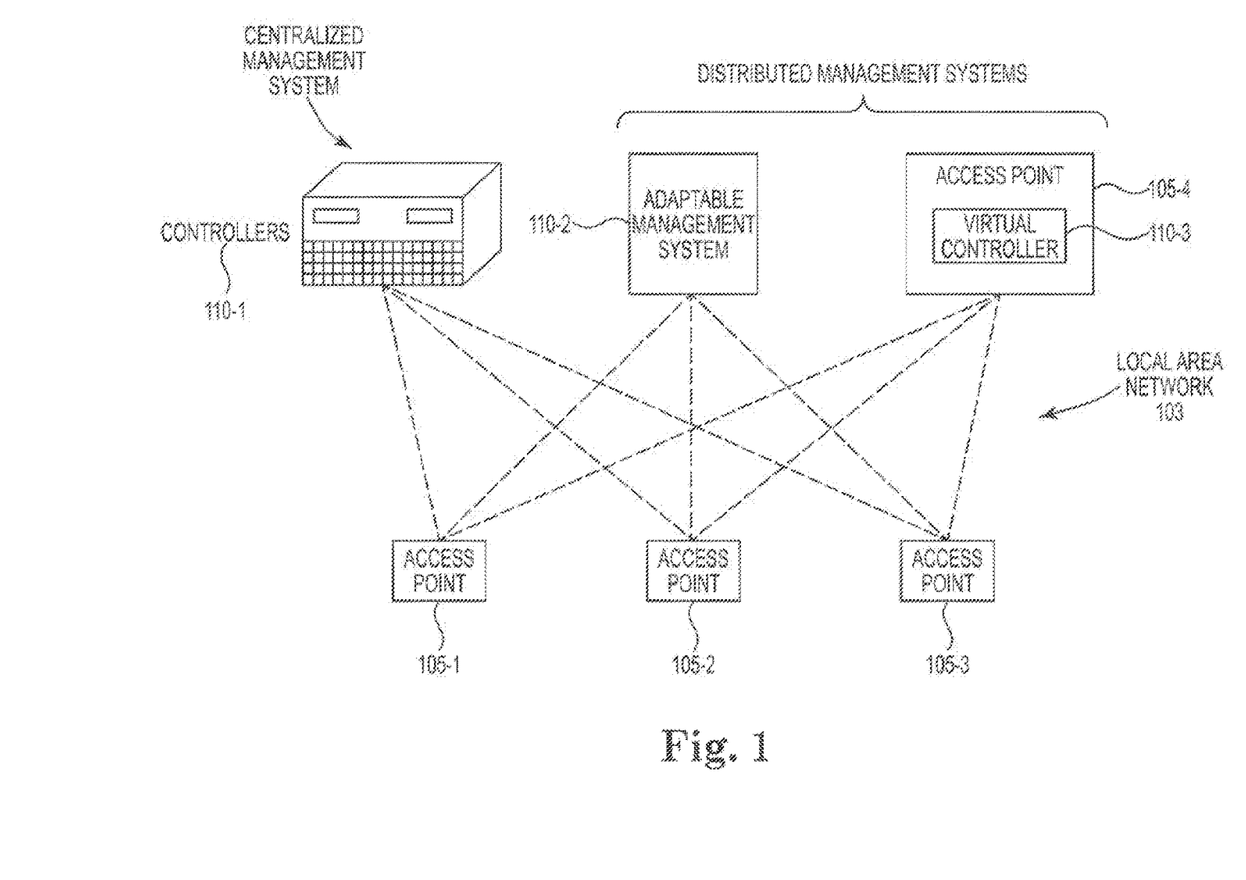
FIG. 1 illustrates an example local area network consistent with the disclosure.

FIG. 1 illustrates a local area network 103 that includes three access points (APs) 105-1, 105-2, and 105-3. The local area network 103 further includes a plurality of management systems 110-1, 110-2, and 110-3 for managing the APs 105-1, 105-2, and 105-3. The controller 110-1 is in the form of a controller, an example of a centralized management system. The management system 110-2 is in the form an adaptable management system, an example of a distributed management system. The adaptable management system may be a management platform able to manage access points (APs) from different vendors or original equipment manufacturers (OEMs). The virtual controller 110-3 is instantiated on another access point 105-4 that is capable of managing access points 105-1, 105-2, and 105-3, as well as access point 105-4 itself. The adaptable management system 110-2 and the virtual controller 110-3 are platforms that are different examples of distributed management systems (DMSs) for managing a plurality of APs. The controller 110-1 is a device that is an example of a centralized management system.

In some implementations, the access points 105-1, 105-2, and 105-3 may each be in communication with a plurality of mobile or stationary client devices (not shown).

In some implementations, the access point 105-1 may be able to discover (e.g., perform a search for and discover) multiple management systems, and selectively connect to one of the controller 110-1, the adaptable management system 110-2, and the virtual controller 110-3. Similarly, the access point 105-2 may be able to discover (e.g., perform a search for and discover) and connect to one of the controller 110-1, the adaptable management system 110-2, and the virtual controller 110-3. In the same way, the access point 105-3 may be able to discover (e.g., perform a search for and discover) and connect to one of the controller 110-1, the adaptable management system 110-2, and the virtual controller 110-3. In other words, the access points 105-1, 105-2, and 105-2 can communicate with the management systems 110-1, 110-2, and 110-3. It should be noted that the access points 105-1, 105-2 and 105-3 can communicate with one another and may together form a system capable of searching a network for management systems and capable of pairing one of the access points 105-1, 105-2, 105-3 with an appropriate management system.

Figure 2:
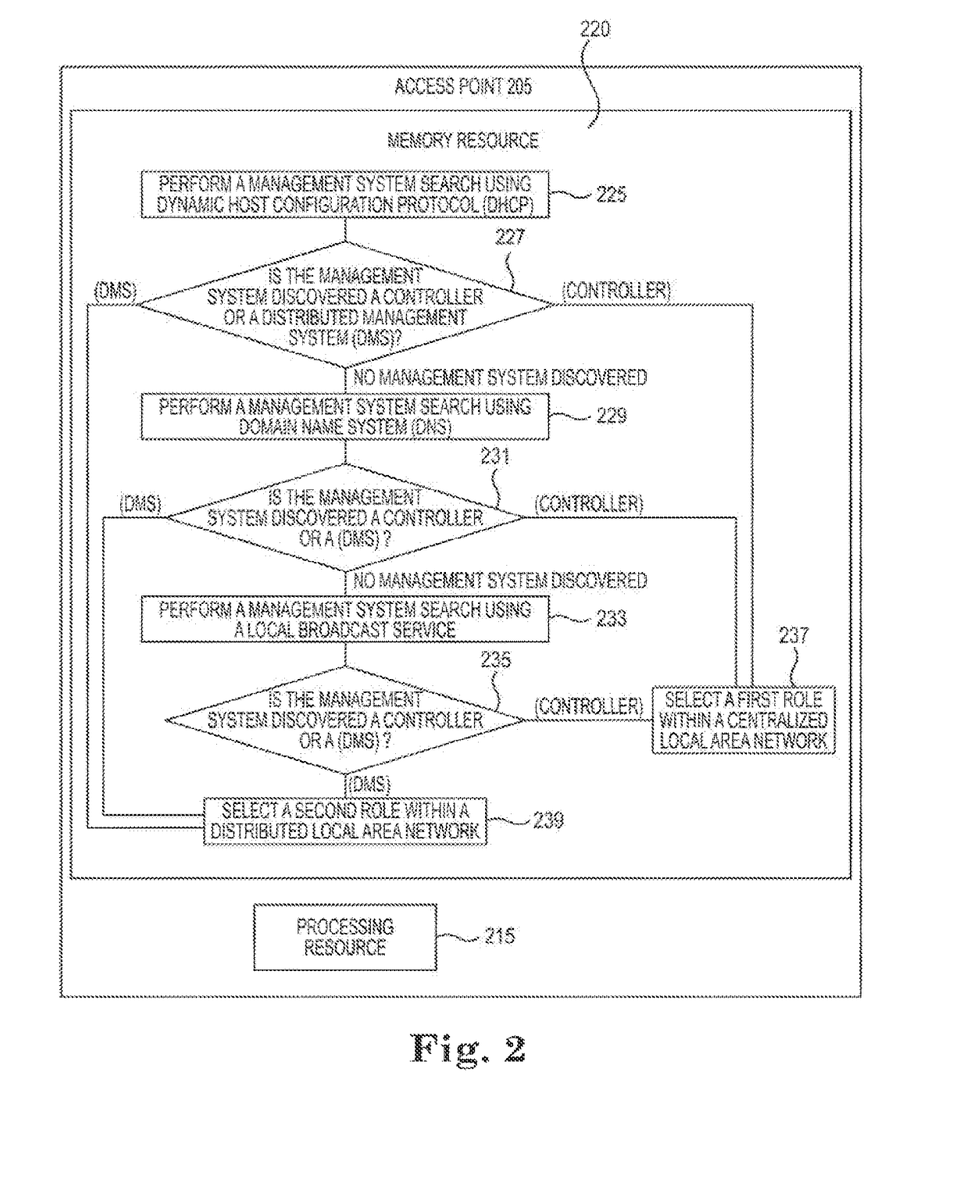
FIG. 2 illustrates an example access point able to select a role consistent with the disclosure.

FIG. 2 illustrates an example access point 205 able to select a role as an access point within a centralized network or as an access point within a distributed network. The AP 205 may include a processing resource 215 and a memory resource 220. The memory resource 220 of the AP 205 may store machine-readable instructions to cause the processing resource to perform some or all of 225 to 239 of FIG. 2. The access point 205 may be one of the access points 105-1, 105-2, and 105-3 shown in FIG. 1.

At 225, the processing resource 215 of the AP 205 may perform a management system search using dynamic host configuration protocol (DHCP). Performing the first management system search using the DHCP includes using option 60 of the DHCP. In some implementations, the access point 205 performs DHCP based discovery by sending a DHCP discover request that includes two option60 sections, one for "centralized access point" and the other for "distributed access point." On the other end, a DHCP server of a management system (such as one of the management systems 110-1, 110-2, and 110-3) may acknowledge one of the option60 sections. The option60 section acknowledged by the DHCP server of the management system depends on how the local area network has been designed by the network administrator.

If a centralized local area network is desired, the DHCP server can be configured to acknowledge the access point 205 by responding "Option60" with "centralized access point" and "Option43" with an internet protocol (IP) address of the controller. Alternatively, if a distributed local area network is desired, the DHCP server can be configured to acknowledge the access point 205 by responding "Option60" with "distributed access point" and "Option 43" with an internet protocol address of an adaptable management system as well as login credentials. If no "option 60" and "option 43" pair is configured, the local area network may not be configured in this manner. Additionally, the access point 205 receives the DHCP acknowledgement and determines the contents of the "option 60" and "option 43" sections. If the access point 205 determines that the "option 60" and "option 43" sections include "centralized access point" and an IP address of a controller, respectively, then the access point 205 has discovered a centralized management system in the form of a controller, such as the controller 110-1. If the access point 205 determines that the "option 60" and the "option 43" sections include "distributed access point" and an IP address of an adaptable management system along with login credentials, respectively, then the access point 205 has discovered a distributed management system, such as the adaptable management system 110-2 or the virtual controller 110-3. In other words, the access point 205 performs a search for hosts (e.g., management systems) corresponding to two different types of local area networks (e.g., centralized and distributed) by sending simultaneous DHCP requests.

At 227, the processing resource 215 of the AP 205 may determine whether a management system discovered is a controller or a distributed management system (DMS). If the management system discovered is a controller, the processing resource 215 of the AP 205 may select a role as an access point within a centralized local area network, as further described in connection with 237 below. If the management system discovered is a DMS, the processor 215 of the access point 205 may select a role as an access point within a distributed local area network, as further described below in connection with 239. If both controllers and DMSs are discovered by the AP 205, the AP 205 may select a role within a centralized local area network as a default, as further described below in connection with 237. In some implementations, it may be possible to set this default differently so that the AP 205 selects a role within a distributed local area network, as further described below in connection with 239.

If no controller or DMS has been discovered by the search using DHCP, the processing resource 215 of the AP 205 may, at 229, perform a management system search using Domain Name System (DNS) to continue searching for management systems. In performing the search using DNS, the AP 205 may use DNS to resolve both "centralized network" and "distributed network." If the AP 205 receives a DNS response to "centralized network," the AP 205 stores the information it receives and it can be said that the AP 205 discovers a controller. Alternatively, if the AP 205 receives a DNS response to "distributed network," the AP 205 stores the information it receives and it can be said that the AP 205 discovers a distributed management system such as an adaptable management system.

At 231, the processing resource 215 of the AP 205 may determine whether a management system discovered is a controller or a DMS. If the management system discovered is a controller, the processor 215 of the AP 205 may select a role as an access point that is a part of a centralized local area network (e.g., a local area network managed by a controller such as the controller 110-1 of FIG. 1), as described below in connection with 237. If the management system discovered is a DMS, the processor 215 of the AP 205 may select a role as an access point that is part of a distributed local area network, as described below in connection with 239. A distributed local area network may be a local area network managed by a DMS, such as the adaptable management system 110-2 or the virtual controller 110-3 of FIG. 1. If both controllers and DMSs are discovered by the search using domain name system (DNS), the processor 215 of the AP 205 may select a role within a centralized local area network, as described below in the discussion of 237. Alternatively, in some implementations, if both controllers and DMSs are discovered by the search using DNS, the processor 215 of the AP 205 may select a role within a distributed local area network, as described in detail in the discussion of 239 below.

If neither controllers nor DMSs are discovered by the search using DNS, the processing resource 215 of the AP 205 may, at 233, perform a management system search using a local broadcast service to continue searching for management systems. Examples of a local broadcast service include master election and a custom-built discovery protocol. At 235, the processing resource 215 of the access point 205 may determine whether a management system discovered is a controller or a DMS. If the management system discovered is a controller, the processing resource 215 of the access point 205 may select a role within a centralized local area network, as further detailed in connection with 237. If the management system discovered is a DMS, the processing resource 215 of the access point 205 may select a role within a distributed local area network, as further detailed in connection with 239. If the processing resource 215 of the access point 205 discovers both a controller and a DMS, the processing resource 215 may select a role within a centralized local area network, as further detailed in connection with 237. Alternatively, in some implementations, if the processing resource 215 finds both a controller and a DMS, the processing resource 215 may select a role as an access point within a distributed management system. If the access point 205 cannot find a controller or a DMS, the access point 205 continues searching for management systems by performing 225 to 239 again.

If the access point 205 selects a role as an access point within a centralized local area network managed by a controller, the access point 205 may connect to the controller (e.g., the controller 110-1 of FIG. 1) in order to facilitate management of the access point 205 by the controller. The access point 205 joins the centralized local area network (e.g., local area network 103 may be centralized in some implementations) in this fashion and client devices can connect to the access point 205 using WLAN, for example. Alternatively, if the access point 205 selects a role as an access point within a distributed local area network (e.g., local area network 103 may be distributed in some implementations), the access point 205 may connect to the distributed management system (e.g., DMS 110-2 or 110-3) so that the DMS can manage the access point 205. The access point 205 can join the distributed network in this manner and client device(s) can connect to the access point 205 to access the network. In this way, the access point 205, which can be called a universal access point, can join either a network managed by a controller or a network managed by a DMS such as an adaptable management system or a virtual controller being operated on another access point. Such a universal access point eliminates the purchasing of different types of access points depending on the management system being used by a network. In some implementations, it also makes the deployment process easier because a customer may not differentiate between different kinds of network when deploying.

In some implementations, after discovering controllers or DMSs using DHCP (227), the access point 205 may continue searching for other controllers or DMSs using DNS (229) and/or a local broadcast service (231). In such an implementation, the access point 205 may discover a plurality of controllers and/or a plurality of DMSs. If the access point 205 discovers a plurality of controllers, the access point 205 may select a prioritized controller of the plurality of controllers and connect to the prioritized controller, such as the controller 110-1. Selecting the prioritized controller includes prioritizing controllers discovered through the management system search using DHCP over controllers discovered through the management system search using DNS. Moreover, selecting the prioritized controller includes prioritizing controllers discovered through the management system search using DNS over any controllers discovered by searching using a local broadcast service.

In some implementations, if the access point 205 discovers a plurality of DMSs, the access point 205 may select a prioritized DMS of the plurality of DMSs and connect to the prioritized DMS, which may be DMS 110-2 or DMS 110-3, depending on how priority is configured by a network administrator. Selecting the prioritized DMS includes prioritizing DMSs discovered through searching using DHCP over DMSs discovered through searching using DNS. Moreover, selecting the prioritized DMS includes prioritizing DMSs discovered through searching using DNS over any DMSs discovered by searching using a local broadcast service.

Figure 3:
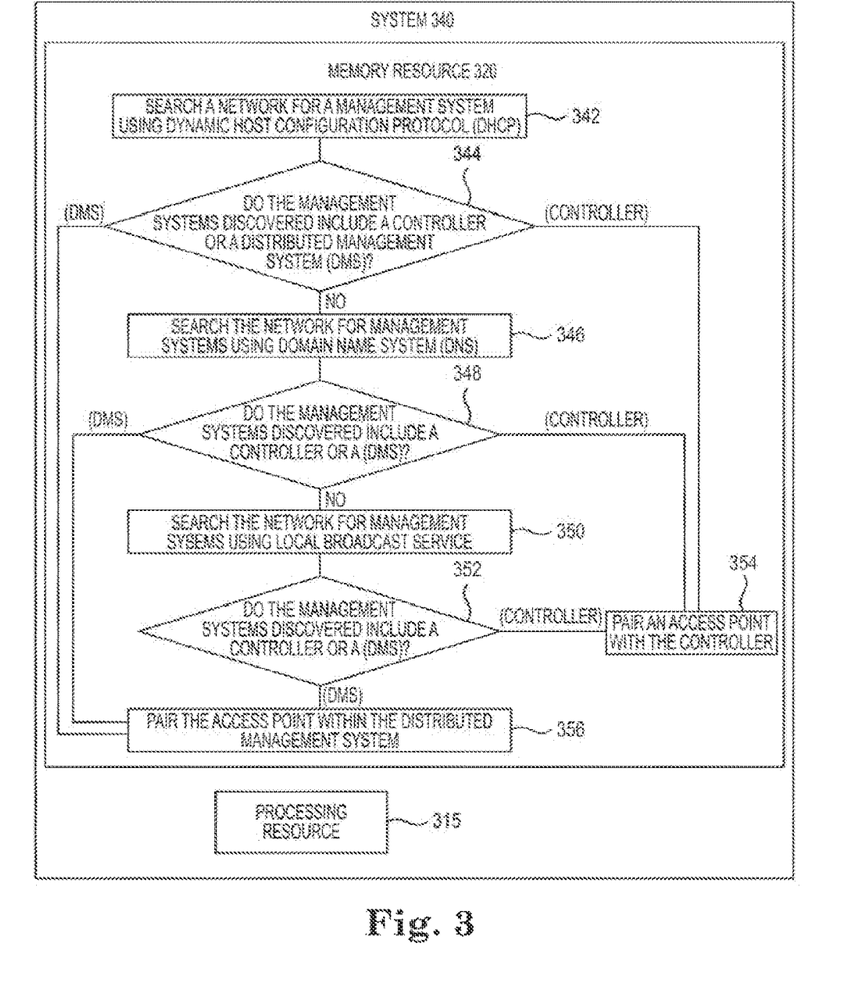
FIG. 3 illustrates an example system consistent with the disclosure.

FIG. 3 illustrates an example system 340 able to pair an access point with the controller or pair the access point with the distributed management system. The system 340 may include a plurality of access points in communication with one another, each comprising a processing resource 315 and a memory resource 320. The memory resource 320 of the system 340 may store machine-readable instructions to cause the processing resource to perform some or all of 342 to 356 of FIG. 3. The access points 105-1, 105-2, and 105-3 of FIG. 1 may share, with one another or with other access points trying to join their network, information regarding available management systems that have been discovered by each of the access points 105-1, 105-2, and 105-3. In some implementations, the information regarding available management systems may be stored on a system 340 that may be implemented on at least one of the access points 105-1, 105-2, and 105-3 shown in FIG. 1. In some implementations, the system 340 may be implemented on at least one management system or may correspond to at least one management system.

At 342, the processing resource 315 of the system 340 may search a network using dynamic host configuration protocol (DHCP). Searching the network using the DHCP includes using option 60 of DHCP. In some implementations, the system 340 performs DHCP based discovery by sending a DHCP discover request that includes two option60 sections, one for "centralized access point" and the other for "distributed access point." On the other end, a DHCP server of a management system (e.g., management system 110-1, 110-2, or 110-3) may acknowledge one of the option60 sections. The option60 section acknowledged by the DHCP server depends on how the local area network has been designed by the network administrator.

If a centralized local area network is desired, the DHCP server can be configured to acknowledge the system 340 by responding "Option60" with "centralized access point" and "Option43" with an internet protocol (IP) address of the controller. Alternatively, if a distributed local area network is desired, the DHCP server can be configured to acknowledge the system 340 by responding "Option60" with "distributed access point" and "Option 43" with an internet protocol address of an adaptable management system as well as login credentials. If no "option 60" and "option 43" pair is configured, the local area network 103 may not be configured in this manner. Additionally, the system 340 receives the DHCP acknowledgement and determines the contents of the "option 60" and "option 43" sections. If the system 340 determines that the "option 60" and "option 43" sections include "centralized access point" and an IP address of a controller, respectively, then the system 340 has discovered a centralized management system in the form of a controller, such as the controller 110-1. If the system 340 determines that the "option 60" and the "option 43" sections include "distributed access point" and an IP address of an adaptable management system along with login credentials, respectively, then the system 340 has discovered a distributed management system, such as DMS 110-2 or DMS 110-3. In other words, the system 340 performs a search for hosts (e.g., management systems) corresponding to two different types of local area networks (e.g., centralized and distributed) by sending simultaneous DHCP requests.

At 344, the processing resource 315 of the system 340 may determine whether a management system discovered is a controller or a distributed management system (DMS). If the management system discovered is a controller, the processing resource 315 of the system 340 may pair an access point with a controller, as further described in connection with 354 below. If the management system discovered is a distributed management system (DMS), the processor 315 of the system 340 may pair the access point with the distributed management system, as further described below in connection with 356. If both controllers and DMSs are discovered by the system 340, the system 340 may pair the access point with the controller as a default, as further described below in connection with 354. In some implementations, it may be possible to set this default differently so that the system 340 pairs the access point with the distributed management system, as further described below in connection with 356.

If no controller or DMS has been discovered by the search using DHCP, the processing resource 315 of the system 340 may, at 346, search the network 103 using Domain Name System (DNS) to continue searching for management systems. In performing the search using DNS, the system 340 may use DNS to resolve both "centralized network" and "distributed network." If the system 340 receives a DNS response to "centralized network," the system 340 stores the information it receives and it can be said that the system 340 discovers a controller. Alternatively, if the system 340 receives a DNS response to "distributed network," the system 340 stores the information it receives and it can be said that the system 340 discovers a distributed management system such as an adaptable management system.

At 348, the processing resource 315 of the system 340 may determine whether a management system discovered is a controller or a DMS. If the management system discovered is a controller, the processor 315 of the system 340 may pair the access point with the controller, such as the controller 110-1 of FIG. 1, as described below in connection with 354. If the management system discovered is a DMS, the processor 315 of the system 340 may pair the access point with the distributed management system, as described below in connection with 356. A distributed local area network may be a local area network managed by a DMS, such as the adaptable management system 110-2 or the virtual controller 110-3 of FIG. 1. If both controllers and DMSs are discovered by the search using domain name system (DNS), the processor 315 of the system 340 may pair the access point with the controller, as described below in the discussion of 354. Alternatively, in some implementations, if both controllers and DMSs are discovered by the search using DNS, the processor 315 of the system 340 may pair the access point with the distributed management system, as described at 356 below.

If neither controllers nor DMSs are discovered by the search using DNS, the processing resource 315 of the system 340 may, at 350, search the network 103 using a local broadcast service to continue searching for management systems. Examples of a local broadcast service include master election and a custom-built discovery protocol. At 352, the processing resource 315 of the system 340 may determine whether a management system discovered is a controller or a distributed management system (DMS). If the management system discovered is a controller, the processing resource 315 of the system 340 may pair the access point with the controller, as further detailed at 354. If the management system discovered is a DMS, the processing resource 315 of the system 340 may pair the access point with the distributed management system, as further detailed in connection with 356. If the processing resource 315 of the system 340 discovers both a controller and a DMS, the processing resource 315 may pair the access point with the controller, as further detailed in connection with 354. Alternatively, in some implementations, if the processing resource 315 finds both a controller and a DMS, the processing resource 315 may pair the access point with the distributed management system. If the system 340 cannot find a controller or a DMS, the system 340 continues searching for management systems by performing 342 to 356 again.

Once the access point (e.g., access point 105-1, 105-2, 105-3, 205) is paired with the controller (e.g., the controller 110-1 of FIG. 1), the access point joins the centralized local area network (e.g., local area network 103 of FIG. 1 may be centralized in some implementations) and client devices can connect to the access point using WLAN, for example. Alternatively, the access point can be paired with the distributed network (e.g., local area network 103 of FIG. 1 may be distributed in some implementations) in this manner and client device(s) can connect to the access point to access the network. In this way, the system 340 can pair an access point with either a network managed by a controller or a network managed by a DMS such as an adaptable management system or a virtual controller being operated on another access point. Such a system implemented on universal access points eliminates the purchase of different types of access points depending on the management system being used by a network.

In some implementations, after discovering controllers or DMSs using DHCP (344), the system 340 may continue searching for other controllers or DMSs using DNS (346) and/or a local broadcast service (348). In such an implementation, the system 340 may discover a plurality of controllers and/or a plurality of DMSs. If the system 340 discovers a plurality of controllers, the system 340 may pair the access point 205 with a prioritized controller (e.g., controller 110-1 of FIG. 1) of the plurality of controllers. Pairing the access point 205 with the prioritized controller 110-1 includes prioritizing controllers discovered through the management system search using DHCP over controllers discovered through the management system search using DNS. Moreover, pairing the access point 205 with the prioritized controller 110-1 includes prioritizing controllers discovered through the management system search using DNS over any controllers discovered by searching using a local broadcast service.

In some implementations, if the system 340 discovers a plurality of DMSs, the system 340 may pair the access point with a prioritized DMS of the plurality of DMSs. Pairing the access point with the prioritized DMS includes prioritizing DMSs discovered through searching using DHCP over DMSs discovered through searching using DNS. Moreover, pairing the access point with the prioritized DMS includes prioritizing DMSs discovered through searching using DNS over any DMSs discovered by searching using a local broadcast service.

Figure 4:
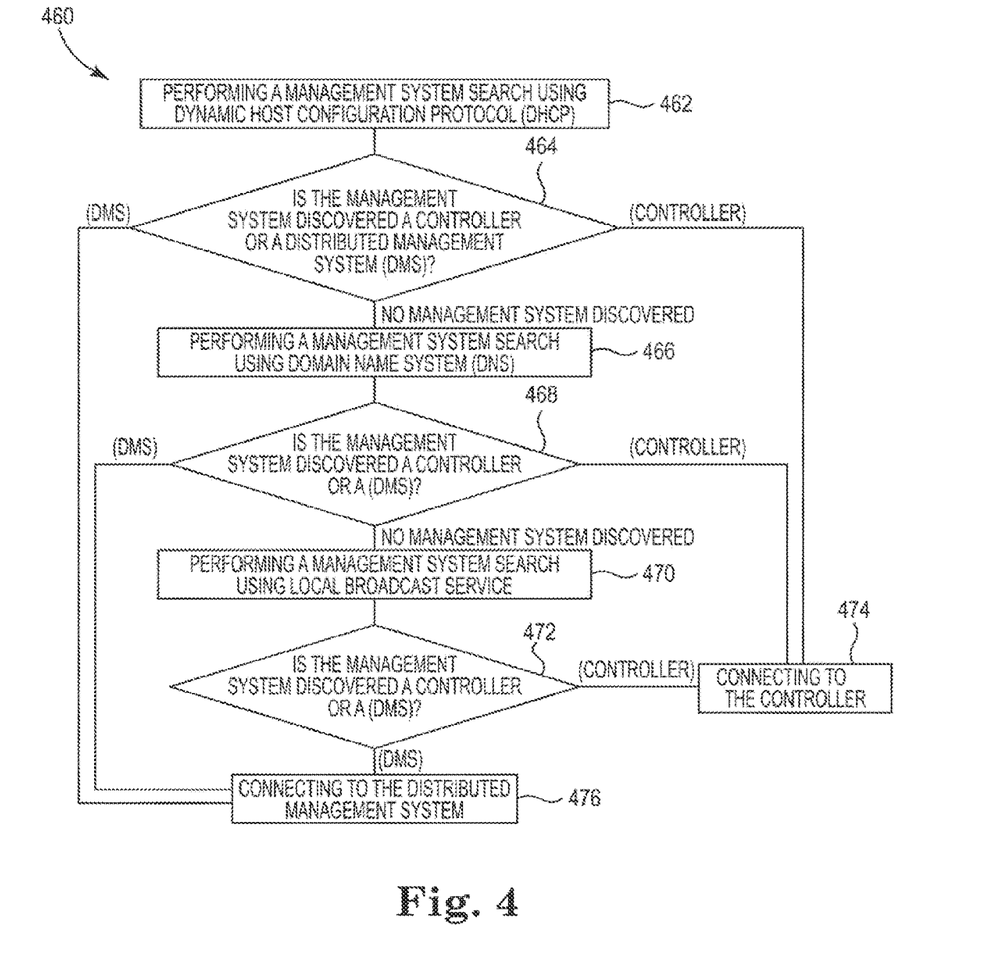
FIG. 4 illustrates an example method consistent with the disclosure.

FIG. 4 illustrates an example method 460 consistent with the disclosure. Method 460 may be performed, for example, by an access point, such as the access point 105-1 described in connection with FIG. 1 or the access point 205 described in connection with FIG. 2. The AP 205 may include a processing resource 215 and a memory resource 220. The memory resource 220 of the AP 205 may store machine-readable instructions to cause the processing resource to perform some or all of 462 to 476 of FIG. 2. Additionally, or alternatively, the method 460 may be performed by a system that includes a number of access points and management systems, such as the system 340 of FIG. 3. The system 340 may include a plurality of access points in communication with one another, each comprising a processing resource 315 and a memory resource 320. The memory resource 320 of the system 340 may store machine-readable instructions to cause the processing resource to perform some or all of 462 to 476 of FIG. 4.

At 462, the method 460 may include performing a management system search using dynamic host configuration protocol (DHCP). For example, the processing resource 215 of the AP 205 of FIG. 2 may perform a management system search using DHCP. Performing the first management system search using DHCP includes using option 60 of DHCP. In some implementations, the access point 205 performs DHCP based discovery by sending a DHCP discover request that includes two option60 sections, one for "centralized access point" and the other for "distributed access point." On the other end, a DHCP server of a management system (e.g., management system 110-1, 110-2, or 110-3 of FIG. 1) may acknowledge one of the option60 sections. The option60 section acknowledged by the DHCP server depends on how the local area network has been designed by the network administrator.

If a centralized local area network is desired, the DHCP server of a management system can be configured to acknowledge the access point 205 by responding "Option60" with "centralized access point" and "Option43" with an internet protocol (IP) address of the controller, for example the controller 110-1. Alternatively, if a distributed local area network is desired, the DHCP server can be configured to acknowledge the access point 205 by responding "Option60" with "distributed access point" and "Option 43" with an internet protocol address of an adaptable management system (e.g., adaptable management system 110-2) as well as login credentials. If no "option 60" and "option 43" pair is configured, the local area network 103 may not be configured in this manner. Additionally, the access point 205 receives the DHCP acknowledgement and determines the contents of the "option 60" and "option 43" sections. If the access point 205 determines that the "option 60" and "option 43" sections include a "centralized access point" and an IP address of a controller 110-1, respectively, then the access point 205 has discovered a centralized management system in the form of the controller 110-1. If the access point 205 determines that the "option 60" and the "option 43" sections include a "distributed access point" and an IP address of an adaptable management system along with login credentials, respectively, then the access point 205 has discovered a distributed management system 110-2. In other words, the access point 205 performs a search for hosts (e.g., management systems) corresponding to two different types of local area networks (e.g., centralized and distributed) by sending simultaneous DHCP requests.

At 464, the method 460 may include the processing resource 215 of the AP 205 determining whether a management system discovered is a controller 110-1 or a distributed management system (DMS). If the management system discovered is a controller 110-1, the method 460 include connecting to the controller, as further described in connection with 474 below. If the management system discovered is a distributed management system (DMS), the method 460 may include connecting to the distributed management system 110-2 or 110-3, as further described below in connection with 476. If both controllers and DMSs are discovered, the method 460 may include connecting to the controller 474 as a default, as further described below in connection with 474. In some implementations, it may be possible to set this default differently so that the method includes connecting to the distributed management system, as further described below in connection with 476.

If no controller or DMS has been discovered by the search using DHCP, the method 460 may further include, at 466, performing a management system search using Domain Name System (DNS) to continue searching for management systems. In performing the search using DNS, the AP 205 may use DNS to resolve both "centralized network" and "distributed network." If the AP 205 receives a DNS response to "centralized network," the AP 205 stores the information it receives and it can be said that the AP 205 discovers a controller, such as the controller 110-1. Alternatively, if the AP 205 receives a DNS response to "distributed network," the AP 205 stores the information it receives and it can be said that the AP 205 discovers a distributed management system such as an adaptable management system 110-2 or a virtual controller 110-3.

At 468, the method 460 may include determining whether a management system discovered is a controller or a DMS. If the management system discovered is a controller, the method 460 may include connecting to the controller, as described below in connection with 474. If the management system discovered is a DMS, the method 460 may include connecting to the distributed management system, as described below in connection with 476. A distributed local area network may be a local area network managed by a DMS, such as the adaptable management system 110-2 or the virtual controller 110-3 of FIG. 1. If both controllers and DMSs are discovered by the search using domain name system (DNS), the method 460 may include connecting to the controller, as described below in the discussion of 474. Alternatively, in some implementations, if both controllers and DMSs are discovered by the search using DNS, the method may include connecting to the distributed management system, as described in detail in the discussion of 476 below.

If neither controllers nor DMSs are discovered by the search using DNS, the method 460 may include, at 470, performing a management system search using a local broadcast service to continue searching for management systems. Examples of a local broadcast service include master election and a custom-built discovery protocol. At 472, the method 460 may include determining whether a management system discovered is a controller or a distributed management system (DMS). If the management system discovered is a controller, the method may include connecting to the controller, as further detailed in connection with 474. If the management system discovered is a DMS, the method may include connecting to the distributed management system, as further detailed in connection with 476. If the processing resource 215 of the access point 205 discovers both a controller and a DMS, the method 460 may include connecting to the controller, as further detailed in connection with 474. Alternatively, in some implementations, if the processing resource 215 finds both a controller and a DMS, the method 460 may include connecting to the distributed management system. If a controller or a DMS cannot be found using 462 to 476 outlined above, the method may include continuing to search for management systems by performing 462 to 476 again.

By connecting to the controller 110-1, the access point 205 joins the centralized local area network (e.g., in some implementations, local area network 103 may be centralized) and client devices can connect to the access point 205 using WLAN, for example. Alternatively, the access point 205 can join the distributed network (e.g., in some implementations, local area network 103 may be distributed) and client device(s) can connect to the access point 205 to access the distributed network. In this way, the access point 205, which can be called a universal access point, can join either a network managed by a controller or a network managed by a DMS such as an adaptable management system or a virtual controller being operated on another access point. Such a universal access point makes the deployment process easier because a customer may not differentiate between different kinds of network when deploying.

In some implementations, after discovering controllers or DMSs using DHCP (464), the access point 205 may continue searching for other controllers or DMSs using DNS (466) and/or a local broadcast service (468). In such an implementation, the access point 205 may discover a plurality of controllers and/or a plurality of DMSs. If the access point 205 discovers a plurality of controllers, the access point 205 may select a prioritized controller (e.g., controller 110-1) of the plurality of controllers. Selecting the prioritized controller includes prioritizing controllers discovered through the management system search using DHCP over controllers discovered through the management system search using DNS. Moreover, selecting the prioritized controller includes prioritizing controllers discovered through the management system search using DNS over any controllers discovered by searching using a local broadcast service.

In some implementations, if the access point 205 discovers a plurality of DMSs, the access point 205 may select a prioritized DMS (e.g., DMS 110-2 or DMS 110-3) of the plurality of DMSs. Selecting the prioritized DMS includes prioritizing DMSs discovered through searching using DHCP over DMSs discovered through searching using DNS. Moreover, selecting the prioritized DMS includes prioritizing DMSs discovered through searching using DNS over any DMSs discovered by searching using a local broadcast service.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure, and should not be taken in a limiting sense.

The invention claimed is:

1. A system, comprising:
a processing resource; and
a memory resource storing machine-readable instructions to cause the processing resource to:
search a network for management systems using a dynamic host configuration protocol (DHCP), a domain name system (DNS), and a local broadcast service;
determine, in view of searching the network, whether the management systems discovered include a controller;
determine, in view of searching the network, whether the management systems discovered include a distributed management system; and
pair an access point with one of the controller and the distributed management system based on determining whether the management systems discovered include the controller and based on determining whether the management systems discovered include the distributed management system.

2. The system of claim 1, wherein the processing resource, when pairing the access point, is further to: pair the access point with the controller when the management systems discovered include the controller.

3. The system of claim 1, wherein the processing resource, when pairing the access point, is further to: pair the access point with the distributed management system when the management systems discovered include the distributed management system.

4. The system of claim 1, wherein the processing resource, when pairing the access point, is further to: pair the access point with the controller when the management systems discovered include the controller and the distributed management system.

5. The system of claim 1, wherein the distributed management system is one of a plurality of distributed management systems and wherein the processing resource, when determining whether the management systems discovered include the distributed management system, is further to: determine that the management systems discovered include the plurality of distributed management systems.

6. The system of claim 5, wherein the processing resource, when pairing the access point with the one of the controller and the distributed management system, is further to: pair the access point with a prioritized distributed management system of the plurality of distributed management systems, wherein the prioritized distributed management system is selected by prioritizing a first set of distributed management systems discovered by the search of the network using the dynamic host configuration protocol (DHCP) over a second set of distributed management systems discovered by the search of the network using the domain name system (DNS), wherein the first and second set are a part of the plurality of distributed management systems.

7. The system of claim 6, wherein the prioritized distributed management system is selected by prioritizing the second set over a third set of distributed management systems discovered by the search of the network using the local broadcast service, wherein third set is a part of the plurality of distributed management systems.

* * * * *